United States Patent

Van Heusden et al.

(10) Patent No.: US 6,414,445 B2
(45) Date of Patent: Jul. 2, 2002

(54) PLASMA DISPLAY PANEL

(75) Inventors: Sybrandus Van Heusden; Gerrit Oversluizen; Siebe T. De Zwart, all of Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1 days.

(21) Appl. No.: 09/790,183

(22) Filed: Feb. 22, 2001

Related U.S. Application Data

(63) Continuation of application No. 09/421,357, filed on Oct. 18, 1999, now Pat. No. 6,222,324.

(30) Foreign Application Priority Data

Oct. 20, 1998 (EP) .............................................. 98203532

(51) Int. Cl.[7] .................................................. G09G 3/10
(52) U.S. Cl. ................................ 315/169.4; 315/169.1; 313/582; 313/576; 345/67
(58) Field of Search ........................... 315/196.1–169.4, 315/167; 313/581–584, 586, 576, 496; 345/37, 42, 51–53, 55, 60, 67, 68

(56) References Cited

U.S. PATENT DOCUMENTS

| | | | | |
|---|---|---|---|---|
| 4,442,007 A | * | 4/1984 | Fouassier et al. | 313/486 |
| 4,866,349 A | * | 9/1989 | Weber et al. | 315/169.4 |
| 5,770,921 A | * | 6/1998 | Aoki et al. | 313/581 |
| 5,851,732 A | * | 12/1998 | Kanda et al. | 430/321 |
| 5,900,694 A | * | 5/1999 | Matsuzaki et al. | 313/484 |
| 5,903,245 A | * | 5/1999 | Shimizu et al. | 345/60 |
| 5,993,543 A | * | 11/1999 | Aoki et al. | 117/101 |
| 6,011,355 A | * | 1/2000 | Nagai | 315/169.4 X |
| 6,100,859 A | * | 8/2000 | Kuriyama et al. | 345/60 |
| 6,222,324 B1 | * | 4/2001 | Van Heusden et al. | 315/169.4 |

FOREIGN PATENT DOCUMENTS

EP         0779643 A2  *  12/1996

* cited by examiner

Primary Examiner—Haissa Philogene
(74) Attorney, Agent, or Firm—Aaron Waxler

(57) ABSTRACT

Plasma display panel in which the fluorescent layer comprises non-saturating green phosphor(s). This improves the efficacy of UV-light generation and allows the use of higher sustain voltages, leading to further improvement of the efficacy and luminance. The display panel may include driver means for sustaining a generated plasma with a sustain voltage whose peak to peak voltage is at least 400V. This can be combined with existing red and blue phosphor to obtain a desired color.

1 Claim, 3 Drawing Sheets

PLASMA DISPLAY PANEL

CROSS REFERENCE TO RELATED APPLICATIONS

This is a continuation of application Ser. No. 09/421,357 filed Oct. 18, 1999 now U.S. Pat. No. 6,222,324.

FIELD OF THE INVENTION

The invention relates to a plasma display panel comprising a first, transparent substrate provided with at least two display electrodes, a second substrate provided with a fluorescent material, in which, at least during use, display electrodes and address electrodes define pixels, and comprising a gas discharge mixture between the two substrates.

The address electrodes may be present on both the first and the second substrate. The fluorescent material is patterned or not patterned, dependent on the type of display device.

A display panel of this type is used, inter alia, in large, flat display screens, for example, for HDTV.

BACKGROUND OF THE INVENTION

A plasma display panel (PDP) of the type described above is known from EP-A-0 779 643. This document states measures of raising the luminance of such a panel. Inter alia, a favorable composition of the gas discharge mixture (between 10% and less than 100% xenon) is proposed for this purpose. A higher percentage of xenon is assumed to increase the quantity of UV radiation and thus to increase the number of photons incident on the fluorescent material for converting UV radiation into visible light.

SUMMARY OF THE INVENTION

A plasma display panel according to the invention is characterized in that the layer of fluorescent material comprises at least one non-saturating green phosphor.

A non-saturating phosphor is herein understood to mean a phosphor in which the number of emitted photons per unit of time and area at a drive (voltage) leading to a luminance of 500 Cd/m$^2$ decreases at most 15% with respect to a drive (voltage) leading to a luminance of 10 Cd/m$^2$. Using excitation by means of a UV-plasma, maintained with AC voltage, this means for example that the efficacy (number of emitted photons/number of incoming photons) decreases by at most 15% at higher frequencies (at least up to 30 kHz and preferably up to 100 kHz or more).

The invention is based on the recognition that, notably at the frequencies at which plasma display panels are operated in the "sustain mode" (sustain frequency (in practice 30-300 kHz)) the total efficacy is much more dependent on the capacity of the phosphors used to convert UV radiation into visible light than on the effectiveness of increasing the quantity of UV radiation. A frequently used green phosphor such as $Zn_2SiO_4$:Mn (willemite) has saturation phenomena from already approximately 1 kHz. The efficacy (number of emitted photons/number of incoming photons) has already decreased to approximately 90% and rapidly decreases at higher frequencies (down to approximately 50% at 100 kHz).

On the other hand, the efficacy remains substantially constant throughout a large frequency range when non-saturating phosphors are used.

A suitable non-saturating green phosphor is, for example $(Ce,Gd)MgB_5O_{10}$:Tb, or CBT.

A preferred embodiment of a plasma display panel according to the invention is characterized in that the display panel comprises drive means for sustaining a generated plasma with a pulse pattern (sustain voltage) whose peak-to-peak voltage is at least 400 V.

This can be combined with existing red and blue phosphor to obtain the right color.

Since non-saturating phosphors are used, the increase of this voltage leads to a higher light output. When saturating phosphors are used, such an increase of this voltage has hardly any effect. It is true that the amount of generated UV radiation in the plasma is increased by a raised voltage, but the efficacy of converting UV radiation into visible light decreases at higher frequencies for saturating phosphors.

BRIEF DESCRIPTION OF THE DRAWINGS

These and other aspects of the invention are apparent from and will be elucidated with reference to the embodiments described hereinafter.

In the drawings:

FIG. 3 shows the behavior of two phosphors as a function of the sustain frequency, while

The Figures are diagrammatic and not to scale.

DETAILED DESCRIPTION OF THE PREFERRED EMBODIMENT

Figure 1:
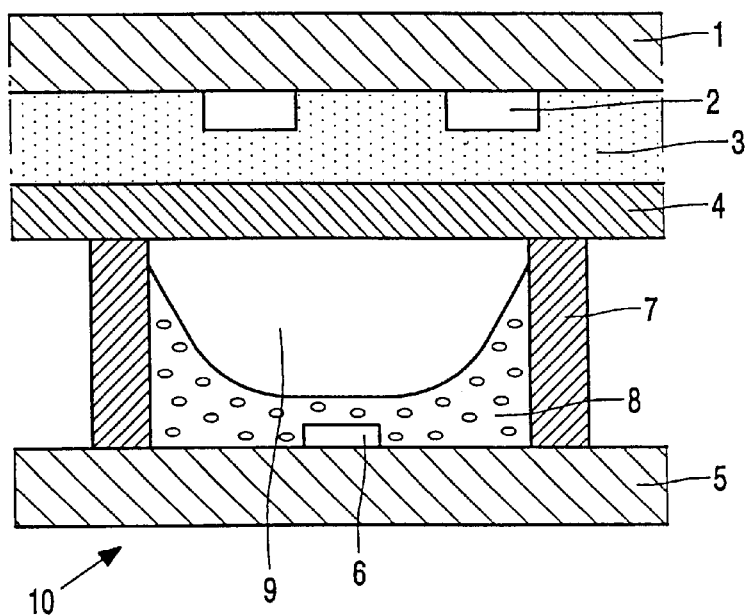
FIG. 1 is a diagrammatic cross-section of a part of a plasma display panel.

FIG. 1 shows a plasma display device 10, in this case an AC plasma display panel (AC PDP), with a first substrate 1 having two display electrodes 2 which are coated with a dielectric layer 3 (for example glass) and a second, transparent substrate 5 provided with a fluorescent material 8. In this example, the second substrate 5 is provided with address electrodes 6. FIG. 1 shows only a part of an address electrode 6; usually, the address electrodes are located in a direction transverse to that of the display electrodes 2. In the relevant example, a pixel as defined by the address electrode 6 and the display electrodes 2 is bounded by partition walls 7 which bound a discharge space. The partition walls 7 are not strictly necessary, for example, when pixels are alternately defined by pairs of even and odd-numbered display electrodes, or otherwise (in co-operation with the address electrodes). Alternatively, display electrodes and address electrodes may be provided on one substrate.

In between the substrates 1, 5, a gas discharge mixture 9, in this example consisting of a neon-xenon mixture, is present in the discharge space. Other mixtures are alternatively possible, for example, helium-xenon, argon-xenon, krypton-xenon, argon-neon-xenon, argon-helium-xenon, krypton-neon-xenon, krypton-helium-xenon or mixtures thereof, the quantity of xenon ranging from 5% to less than 100%.

Figure 2:
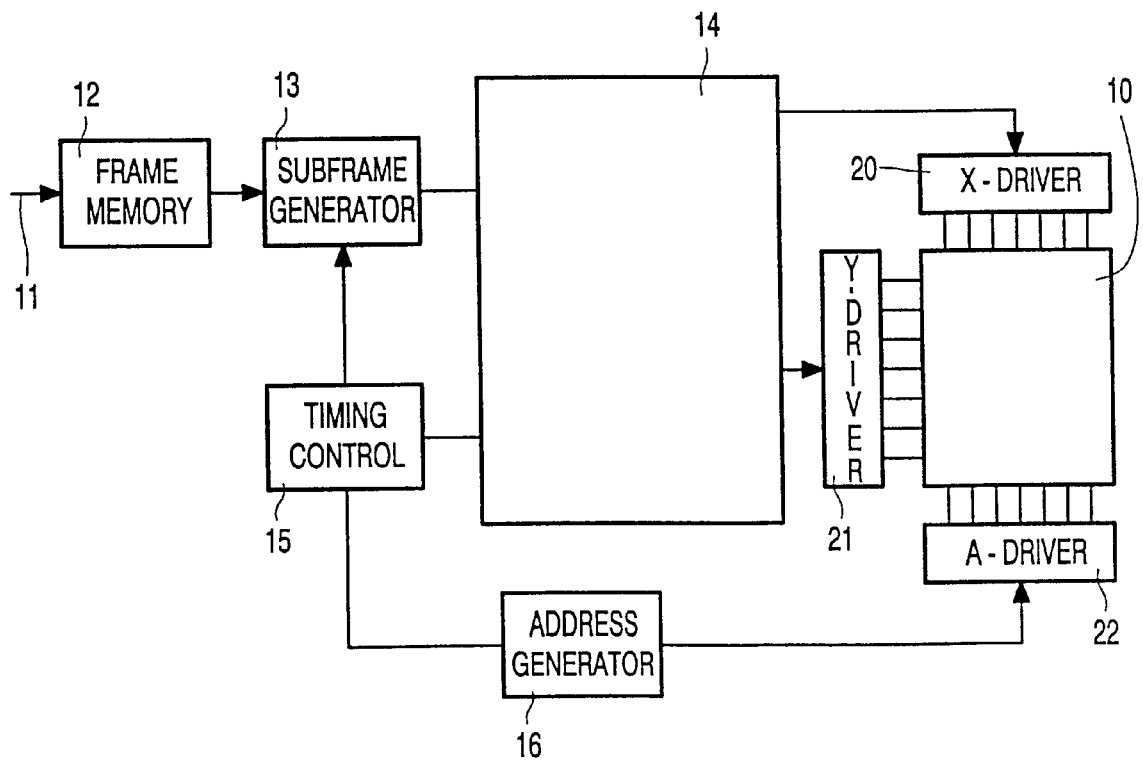
FIG. 2 shows diagrammatically a part of a plasma display panel.

As is known, UV radiation is generated at the location of a pixel in the discharge space of plasma display devices (plasma display panels or PDPs), which radiation causes the fluorescent material 8 (phosphors) to luminesce. To this end, the display electrodes 2 are driven, for example, from X and Y drivers 20, 21 and the address electrodes are driven from an A driver 22 (FIG. 2). To this end, an incoming signal 11 is stored in a frame memory 12 and in a sub-frame generator 13. The required pulses are generated in the processing unit 14 for the reset pulses, the ignition pulses and the sustain pulses which energize the display electrodes 2 via the X and Y drivers 20, 21, while addressing takes place via the A driver 22 controlled by an address generator 16. Mutual synchronization takes place via a timing control circuit 15.

After a pixel has been ignited, the ignition is sustained by the sustain pulses across the display electrodes within a pixel. Dependent on the grey hue to be displayed, these are presented more frequently or less frequently per pixel. The sustain frequency therefore determines the (maximum) frequency used in the cell. Dependent on the drive mode, it may range between 30 and 500 kHz.

Figure 3:
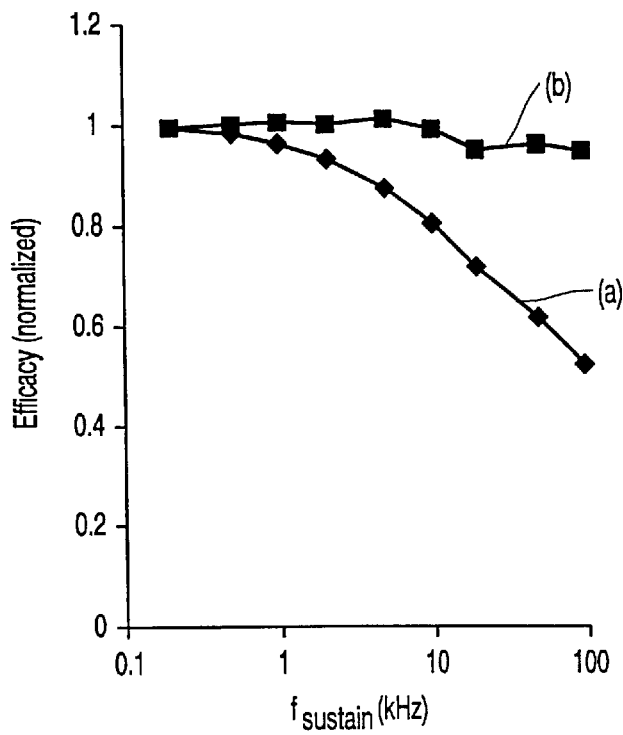

FIG. 3 shows the efficacy of the conversion to visible light of a saturating phosphor ($Zn_2SiO_4$:Mn (willemite)) and of a non-saturating phosphor ((Ce,Gd)$MgB_5O_{10}$:Tb, or CBT) as a function of said sustain frequency in such a display device. This frequency is a measure of the number of UV photons generated in the gas discharge mixture 9 (at an increasing frequency, the number of photons increases) while the efficacy is a measure of the number of visible photons per UV photon impinging on the phosphor.

FIG. 3 shows clearly that the efficacy decreases (curve a) for willemite already from approximately 1 kHz, presumably due to the large decay time, whereas the efficacy of CBT up to 100 kHz (and even higher) hardly decreases (curve b).

Figure 4:
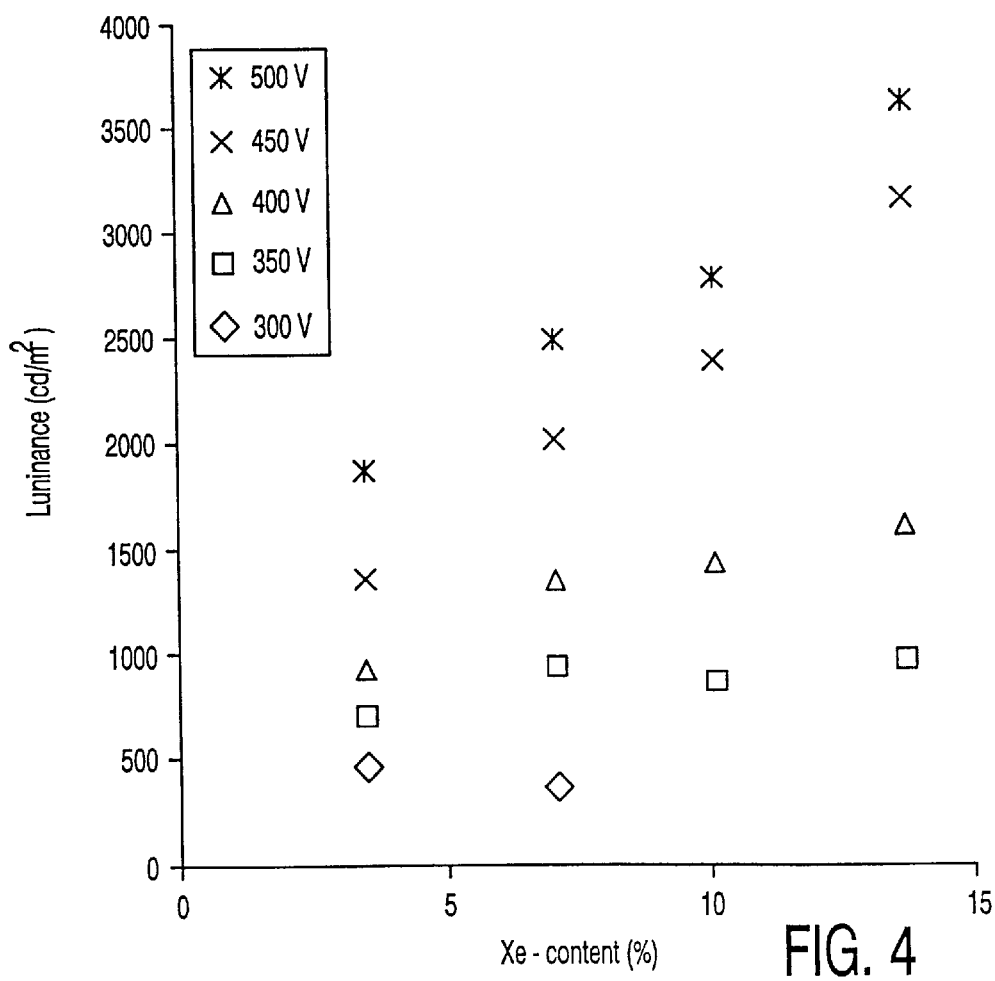
FIG. 4 shows the luminance as a function of the xenon content in the gas discharge mixture as a function of the sustain voltage in a plasma display panel according to the invention.

FIG. 4 shows the influence of the percentage of xenon in the neon-xenon mixture used on the luminance of a plasma display panel using CBT for different values of the sustain voltage. The efficacy is shown as a function of said percentage for different values of the peak-to-peak voltage of the sustain pulses (in practice, half of this value, the amplitude of the voltage with respect to (virtual) earth is indicated as sustain voltage). All measurements were performed at a sustain frequency of 50 kHz. These measurements show that for a peak-to-peak voltage of 300 V no plasma is generated at xenon percentages above 8% whereas at voltages of 350 V and 400 V the efficacy decreases only slightly with an increasing xenon percentage. Presumably, the generation of UV radiation is decisive of the total luminance at these voltages in the overall process from plasma generation to emission of visible light. At higher peak-to-peak voltages (450 V, 500 V) more UV photons are generated; as the phosphor used is non-saturating at 50 kHz, more photons per UV photon are generated in the visible range, so that the luminance increases considerably.

Figure 5:
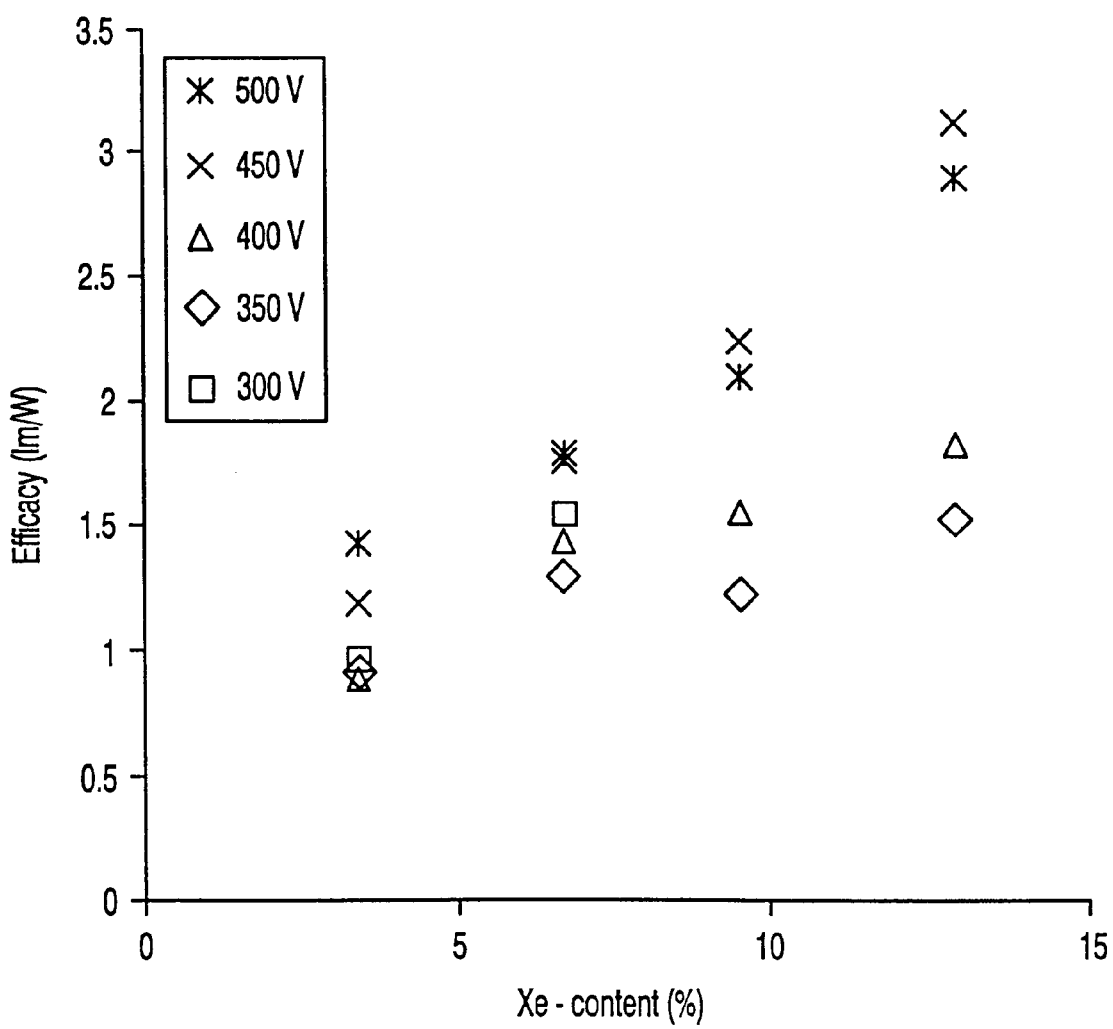
FIG. 5 shows the efficacy as a function of the xenon content in the gas discharge mixture as a function of the sustain voltage in a plasma display panel according to the invention.

FIG. 5 shows a similar curve for the efficacy of said display panel.

Although the invention has been elucidated by way of only one example, similar considerations also apply to other non-saturating phosphors.

In summary, the invention relates to a plasma display panel comprising a fluorescent material with at least one non-saturating phosphor, improving the efficacy. Moreover, the luminance and efficacy may be further improved by increasing the sustain voltage.

The invention resides in each and every novel characteristic feature and each and every combination of characteristic features.

What is claimed is:

1. A plasma display panel comprising a first, transparent substrate provided with at least two display electrodes, a second substrate provided with a fluorescent material, in which, at least during uses display electrodes and address electrodes define pixels, and comprising a gas discharge mixture between the two substrates, characterized in that the layer of fluorescent material comprises at least one non-saturating green phosphor, characterized in that the gas discharge mixture comprises rare gases, including 10% to less than 100% of xenon.

* * * * *